United States Patent Office.

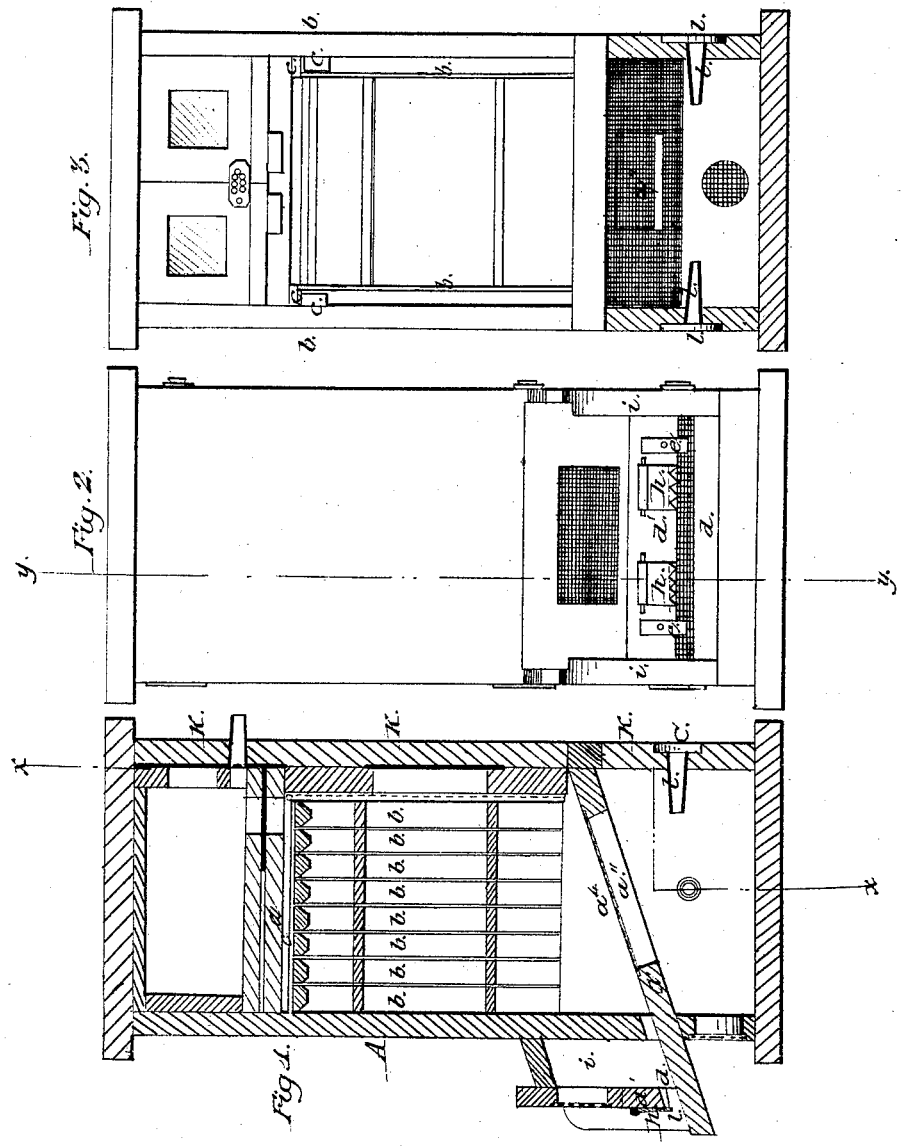

R. P. STARBUCK, OF GALLATIN, MISSOURI.

Letters Patent No. 90,203, dated May 18, 1869.

IMPROVEMENT IN BEE-HIVES.

The Schedule referred to in these Letters Patent and making part of the same.

*To all whom it may concern:*

Be it known that I, R. P. STARBUCK, of Gallatin, in the county of Daviess, and State of Missouri, have invented a new and improved Bee-Hive; and I do hereby declare that the following is a full, clear, and exact description of the construction and operation of the same, reference being had to the accompanying drawings, making a part of this specification, in which—

Figure 1 is a vertical section through the line $y\ y$ of fig. 2.

Figure 2 is a front elevation, and

Figure 3 is a rear elevation, showing the interior of the hive.

This invention consists in providing the entrance with a protector, for the purpose of excluding drones, and arranging swinging outlets in said protector, for the purpose of letting drones out that may have gained access.

In the drawings—

A is a wooden box or casing, divided by transverse partitions $a\ a'$ into three compartments, whereof the topmost is occupied with boxes, and the middle with a series of comb-frames, $b$, suspended near the top of the compartment, and hanging vertically, such suspension being effected by means of ears $b'$, and horizontal guides $C\ C'$, between which said ears slide, so that the frames $b$ may be easily removed or replaced.

The entrance to the hive is shown at $d$, formed by raising the cover $d'$ in its perpendicular slots in the walls $i$, just three-eighths of an inch, to enable working-bees to pass under it, but not to enable drones to pass, which are ordinarily of larger size than working-bees.

The cover $d'$ is supported in this position by legs $e\ e$, of sheet-metal, fastened to the outside of it.

To allow for the expulsion of any drones that may have gained access to the interior of the hive, two grooves are made transversely to the slide $d'$, and covered by flaps $h$, which swing outward on hinges, but do not swing inward.

The lower compartment of the hive is intended for a moth-trap. It is provided with a door, $k$, in front, (all the compartments are so provided,) through which, and through the two sides, are circular apertures, provided each with a pipe, $l$, tapering inward, so as to afford easy access to moths, but not an easy avenue of escape.

The flooring $a'$ slopes downward and backward, and is provided with an orifice, $a''$, covered with a wire screen, $a'''$.

The inclination of the floor tends to cause the litter of the compartment to slide down to the aperture $a''$, and thence to fall into the moth-trap, while the wire screen prevents bees and honey from falling.

Having thus described my invention,

What I claim as new, and desire to secure by Letters Patent, is—

The adjustable entrance-protector $d'$, in combination with the legs $l$ and flaps $h$, as and for the purpose specified.

R. P. STARBUCK.

Witnesses:
JOHN M. BROWN,
SAMPSON ALLEY.